US012378701B2

United States Patent
Clauss et al.

(10) Patent No.: US 12,378,701 B2
(45) Date of Patent: Aug. 5, 2025

(54) METHOD AND DEVICE FOR STABILIZING PRECURSOR FIBERS OR FILMS FOR PRODUCING CARBON FIBERS OR FILMS

(71) Applicant: CENTROTHERM INTERNATIONAL AG, Blaubeuren (DE)

(72) Inventors: Manuel Clauss, Ostfildern (DE); Andreas Keller, Opfingen (DE); Erik Frank, Dornstadt (DE); Volker Bauch, Zell unter Aichelberg (DE); Frank Hermanutz, Leonberg (DE); Michael R. Buchmeiser, Remshalden (DE); Gunter Fauth, Urbach (DE)

(73) Assignee: CENTROTHERM INTERNATIONAL AG, Blaubeuren (DE)

( * ) Notice: Subject to any disclaimer, the term of this patent is extended or adjusted under 35 U.S.C. 154(b) by 963 days.

(21) Appl. No.: 17/283,971

(22) PCT Filed: Oct. 10, 2019

(86) PCT No.: PCT/EP2019/077438
§ 371 (c)(1),
(2) Date: Apr. 9, 2021

(87) PCT Pub. No.: WO2020/074623
PCT Pub. Date: Apr. 16, 2020

(65) Prior Publication Data
US 2021/0355610 A1  Nov. 18, 2021

(30) Foreign Application Priority Data
Oct. 10, 2018  (DE) .......................... 102018217354.0

(51) Int. Cl.
*D01F 9/16* (2006.01)
*C08L 1/02* (2006.01)
(Continued)

(52) U.S. Cl.
CPC .................. *D01F 9/16* (2013.01); *C08L 1/02* (2013.01); *C08L 33/20* (2013.01); *C08L 97/005* (2013.01);
(Continued)

(58) Field of Classification Search
CPC ... D01F 9/16; D01F 2/02; D01F 11/02; D01F 9/17; D01F 9/225; D01F 9/22; C08L 1/02;
(Continued)

(56) References Cited

U.S. PATENT DOCUMENTS 6,733,737 B1   5/2004  Tan et al.
7,649,078 B1   1/2010  Paulauskas et al.
(Continued)

FOREIGN PATENT DOCUMENTS

JP    2010242248 A    10/2010
WO   WO-2017137285 A1 *  8/2017  ............. D01F 11/02

OTHER PUBLICATIONS

English Translation of JP2010-242248 https://www.j-platpat.inpit.go.jp/p0200 (Year: 2010).*
(Continued)

*Primary Examiner* — Ling Siu Choi
*Assistant Examiner* — Olga Lucia Donahue
(74) *Attorney, Agent, or Firm* — Tarolli, Sundheim, Covell & Tummino LLP (57) ABSTRACT

A process for stabilizing precursor fibers for the production of carbon fibers is disclosed. The process comprises the following steps: continuously introducing, passing and removing said precursor fibers into, through and from a
(Continued)

process chamber; establishing a predetermined process gas atmosphere different in composition from ambient air in said at least one process chamber, said process gas atmosphere containing at least one of a reactive component and a catalyst having a predetermined partial pressure; while said precursor fibers are in said process chamber, heating the precursor fibers to at least a first temperature and maintaining said first temperature for a predetermined period of time.

21 Claims, 4 Drawing Sheets

(51) Int. Cl.
- C08L 33/20 (2006.01)
- C08L 97/00 (2006.01)
- D01F 9/17 (2006.01)
- D01F 9/22 (2006.01)

(52) U.S. Cl.
CPC ............... *D01F 9/17* (2013.01); *D01F 9/225* (2013.01); *C08L 2201/08* (2013.01); *C08L 2203/12* (2013.01); *C08L 2205/03* (2013.01)

(58) Field of Classification Search
CPC .... C08L 33/20; C08L 97/005; C08L 2201/08; C08L 2203/12; C08L 2205/03; D06M 13/256

See application file for complete search history.

(56) References Cited

U.S. PATENT DOCUMENTS

| 2014/0212663 | A1 | 7/2014 | Shinmen et al. | |
| 2016/0258082 | A1* | 9/2016 | Rios | D01F 9/14 |
| 2019/0062954 | A1* | 2/2019 | Abels | D01F 2/02 |

OTHER PUBLICATIONS

Structure and properties of oxidatively stabilized viscose rayon fibers impregnated with boric acid and phosphoric acid prior to carbonization and activation steps, Oct. 27, 2013, Vo. 48, p. 2009-2021). https://link.springer.com/article/10.1007/s10853-012-6970-5 (Year: 2012).*

PCT International Search Report for corresponding International Application Serial No. PCT/EP2019/077438, mailed Nov. 15, 2019, pp. 1-2.

* cited by examiner

METHOD AND DEVICE FOR STABILIZING PRECURSOR FIBERS OR FILMS FOR PRODUCING CARBON FIBERS OR FILMS

RELATED APPLICATIONS

The present invention is a U.S. National Stage under 35 USC 371 patent application, claiming priority to Serial No. PCT/EP2019/077438, filed on 10 Oct. 2019; which claims priority from 10 2018 217 354.0, filed 10 Oct. 2018, the entirety of both of which are incorporated herein by reference.

TECHNICAL FIELD

It is known to produce carbon fibers or carbon sheets or films from different precursor materials. Since the processes are essentially the same for both fibers and sheets, only the fibers will be explained in more detail below. Carbon fibers are technically produced in several process steps. The starting material is usually polyacrylonitrile, in short PAN, but other precursors, in particular lignin, cellulose and polyethylene, are also considered as alternatives for the carbon fiber production.

BACKGROUND

The first step in the process is to form the starting materials into so-called precursor fibers. These precursor fibers are subsequently converted into carbon fibers in two further process steps in separate sections. The first step is called stabilization while the second is called carbonization. While carbonization usually takes place at high temperatures above 1300° C., stabilization, which leads to stabilization or crosslinking of the precursor fibers, takes place at much lower temperatures, usually in the range of 200° C. to 300° C. This step is necessary to change the molecular structures of the precursor fibers in such a way that the fibers can withstand the thermal stress during carbonization.

Stabilization is usually carried out in a forced-air oven with separately heatable zones, in which the precursor fibers are heated to temperatures between 200° C. and 300° C. and react with the oxygen in the air at atmospheric pressure. The stabilization process produces gaseous reaction products, such as carbon dioxide, hydrocyanic acid, carbon monoxide and ammonia, which have to be removed and disposed of in a controlled manner. This results in complex and expensive waste gas treatment. Currently, the stabilization is the most cost- and time-intensive step in the production of a carbon fiber. Attempts to reduce the reaction time seem to be desired, but present challenges.

In the case of the PAN precursor material, an oxidation reaction with conventional ambient air occurs during stabilization. The oxygen in the ambient air builds into the chemical structure of the polymer and ultimately forms water with the hydrogen in the fiber in the subsequent step of carbonization. Therefore, a controlled oxidation would be advantageous to introduce an optimal amount of oxygen. An excess of oxygen in this process can reduce the quality of the carbon fiber, as it may excessively oxidize the carbon.

Other precursors already containing oxygen, such as lignin or cellulose, do not necessarily require externally supplied oxygen for stabilization, but externally supplied oxygen can accelerate stabilization in some cases. In all cases of stabilization, the structure of the precursor densifies. To promote stabilization, it is also known to introduce reactive substances and/or catalysts into the fibers, which is achieved, for example, by passing the fibers through appropriate baths containing the substances.

In terms of economy, rapid stabilization is desired, but from a chemical point of view it poses problems. In the worst case, the structure of the fiber becomes so dense at its surface that the absorption of oxygen and the removal of product gases during stabilization are impeded by the formation of a fiber sheath.

A reduction in the residence time is therefore not feasible under conventional conditions in the forced-air oven. Increasing the process temperature is also not possible, since the stabilization reaction in the case of PAN is strongly exothermic and too high a temperature can lead to a spontaneous and uncontrolled release of energy, which can cause the fiber material to ignite.

SUMMARY

It is therefore an object of the present invention to overcome or improve one or more of the problems of the prior art. In accordance with the invention, a process according to claim 1 is provided. Further embodiments of the invention will, inter alia, be apparent from the dependent claims.

In particular, a process for stabilizing precursor fibers for the production of carbon fibers comprises the following steps: continuously introducing, passing and removing said precursor fibers into, through and from a process chamber, setting a predetermined process gas atmosphere different in composition from ambient air in said at least one process chamber, said process gas atmosphere containing at least one reactive component and/or a catalyst at a predetermined partial pressure, while said precursor fibers are in said process chamber, heating the precursor fibers to at least a first temperature and maintaining said first temperature for a predetermined period of time.

The process allows stabilization under controlled and well-defined process conditions and at temperatures that are in some cases higher than the temperatures commonly used in the prior art. By providing the reactive component and/or a catalytic component at a predetermined partial pressure, this component can be provided in a controlled manner that is advantageous for the process. Pre-cursor fibers processed in this way reproducibly showed high density and uniformity, resulting in excellent strength values in the subsequently carbonized fibers.

During the process, the pressure in the process chamber can be maintained at ambient pressure or at a pressure between ambient pressure and at least 90%, preferably at least 95% of ambient pressure, which reduces the requirements for sealing the process chamber relative to a vacuum system designed for lower pressures.

In one embodiment, the precursor fibers are heated from the first temperature to that of the second temperature via at least one further intermediate temperature, wherein the temperature difference between temporally successive stages is at least 5° C., in particular at least 10° C., and wherein the precursor fibers are maintained at the at least one intermediate temperature for a predetermined period of time. A multi-stage temperature increase has proved particularly advantageous. Preferably, the second temperature is at least 30° C., in particular at least 40° C. higher than the first temperature. For good process results, the precursor fibers are preferably kept at the first temperature, the second temperature and at least one optional intermediate temperature for at least 10 minutes each, preferably for at least 20 minutes.

For precursor fibers containing PAN fibers, the first temperature should be in the range of 220 to 320° C. and the second temperature in the range of 280 to 400° C. Particularly good results were obtained when the first temperature was in the range 260 to 320° C. and the second temperature in the range 300 to 380° C. For precursor fibers containing PAN fibers, the process gas atmosphere preferably contains oxygen as a reactive component with a partial pressure of 30 to 300 mbar, preferably 50 to 200 mbar. This can be achieved at atmospheric pressure or slightly negative pressure, for example, by a corresponding mixture of pure nitrogen with ambient air (about 78% by volume nitrogen, about 21% by volume oxygen and about 1% by volume other gases, such as argon and others) or pure oxygen.

For precursor fibers made of cellulose and/or lignin, the first temperature is preferably in the range 200-240° C. and the second temperature is preferably in the range 240-300° C. If the precursor fibers contain cellulose, the process gas atmosphere should be an acidic atmosphere that promotes dehydration of cellulose. Preferably, an acidic component in the process gas is controlled by its partial pressure to control dehydration. If the precursor fibers contain lignin with a latent curing agent, the process gas atmosphere should again preferably be an acidic atmosphere that activates the latent curing agent in the lignin. Again, the acidic component in the process gas can be controlled by its partial pressure to control activation.

For cellulose and lignin fibers, it is also conceivable that the curing agent is added from the gas phase, in which case it is preferably reactive formaldehyde. In the case of cellulose fibers, it may also be useful to impregnate the fibers with sulfur-containing substances from the gas phase, with the aim to increase the carbon yield of the fiber.

To increase the mechanical strength, in particular the stiffness of the final carbon fiber based on PAN and/or lignin and/or cellulose, it has proved advantageous to introduce boron-containing compounds into the fiber via the gas phase. The use of diborane as boronating reagent is particularly preferred. It would be advantageous to achieve a boron concentration of 0.1-2%.

It could also be useful to treat precursor fibers made from blends of PAN and lignin with iodine, which would provide increased strength and orientation of the final carbon fiber.

For good process results, the precursor fibers are preferably kept under defined tension during the process. Here, a tension in the range between 0.5 and 10 N per 3 k fiber bundle has proven to be suitable.

For good and uniform processing, the process gas atmosphere is preferably exchanged continuously or intermittently during the stabilization process. This can ensure that the reactive and/or catalytic component is available at a substantially constant partial pressure throughout the process. In addition, reaction products can be removed from a process area in a controlled manner. In particular, the process area can be continuously flushed with an appropriate gas flow. The flow rate depends on the dimensions of the process chamber and the amount and type of processed material.

In one embodiment, the precursor fibers are passed during the process through a plurality of substantially parallel extending process chambers, wherein adjacent process chambers are connected at one end by a deflection unit such that the fibers remain in the process gas atmosphere.

BRIEF DESCRIPTION OF THE FIGURES

The invention is explained in more detail below with reference to the drawings. In the drawings.

DETAILED DESCRIPTION

Terms used in the description, such as top, bottom, left and right, refer to the representation in the drawings and are not to be taken in a limiting sense, although they may also refer to preferred orientations. In the following, the basic structure of a stabilizing apparatus 1 and of an alternative structure will be explained in more detail with reference to the figures. The same reference signs are used throughout the figures, inasmuch as the same or similar elements are described.

Figure 1:
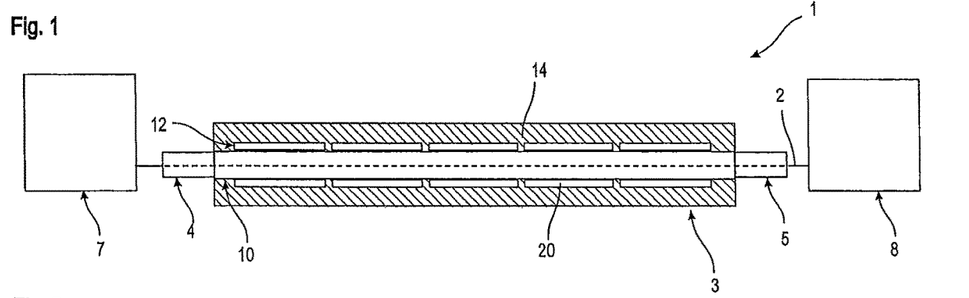
FIG. 1 shows a schematic side view of a stabilizing apparatus according to the invention, wherein a process unit is shown in section.
Figure 2:
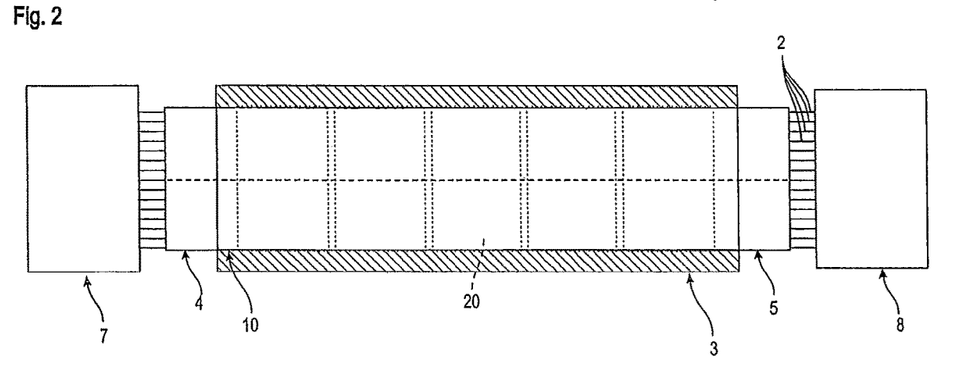
FIG. 2. shows a schematic top view of the apparatus according to FIG. 1, with the process unit again shown in section.

A basic structure of a stabilizing apparatus 1 for precursor fibers 2 is shown in FIGS. 1 and 2. The stabilizing apparatus 1 consists essentially of a central process unit 3 with an inlet-side airlock unit 4 and an outlet-side airlock unit 5, as well as a fiber feed 7 and a fiber take-up 8. Strictly speaking, the fiber feed 7 and the fiber take-up 8 are not part of the stabilizing apparatus 1 per se, since they merely provide a fiber feed to the stabilizing apparatus 1 and a take-up from the same. They are suitable for continuously supplying precursor fibers 2 and receiving the stabilized fibers, respectively. The units 7, 8 are each suitable for supplying or receiving a plurality of precursor fibers 2 parallel to one another in one plane, as indicated in the top view in FIG. 2. Since such units are known and are available on the market in various designs, no further description of these units 7, 8 will be given.

The process unit 3 has an elongated process chamber 10, a heating unit 12 directly adjacent to, in contact with or within the process chamber 10, and an insulation 14 which surrounds the process chamber 10 and possibly the heating unit 14. The process chamber can be designed as a vacuum chamber with a corresponding gas tightness. However, it can also be designed as an atmospheric chamber, which is preferably sufficiently gas-tight to prevent process gases from escaping from the interior of the chamber into the environment, as well as to prevent ambient air from entering the process atmosphere. Further, the process unit 3 has at least one pump, optionally configured as a vacuum pump, and a gas supply, both suitably connected to the process chamber 10. The pump and the gas supply are not shown, since the respective structure is not essential for the invention. The gas feed is adapted to provide a process gas mixture including a reactive component and/or a catalytic component at a predetermined partial pressure within an otherwise preferably inert gas. The pump, if processes are to be carried out at atmospheric pressure or slightly negative pressure (to prevent escape of the process gas atmosphere), is essentially used to discharge the process gas and resulting reaction products in a controlled manner. In one embodiment, the pump can also be dispensed with altogether, and the discharge of gases can be controlled only by an outlet and the introduction of gases. In the case of a vacuum process, the pump should be suitably designed to be able to set a desired pressure of, for example, 50 to 300 mBar within the process chamber 10.

Figure 3:
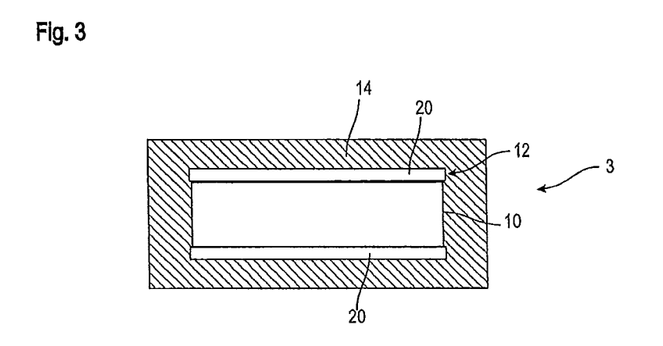
FIG. 3. shows a schematic cross-sectional view through a process unit of the apparatus according to FIG. 1.

The process chamber 10 has a rectangular cross-section, as best shown in FIG. 3. At its longitudinal ends, the process chamber 10 is connected to airlock units 4, 5, through which, as will be explained in more detail herein below, precursor fibers 2 can be continuously introduced into the process chamber 10. The vacuum chamber 10 is constructed of a suitable heat-resistant material, preferably heat-resistant up to at least 400° C. The process chamber 10 has, for example, a length of 2 m to 6 m, although other lengths are of course conceivable.

The heating unit 12 has a plurality of individually controllable heating plates 20, which are only schematically indicated in the top view in FIG. 2. According to FIGS. 1 and 3, the heating plates 20 are arranged in pairs above and below the process chamber 10. The heating plates each cover the entire width of the process chamber 10 and the pairs are adjacent in the longitudinal direction. This forms zones that can be individually heated. In the illustration in FIGS. 1 and 2, five pairs of heating plates 20 are shown, resulting in five different heatable zones. The number of pairs of heating plates and the zones formed thereby may differ from the number shown, although at least two zones should be present. Instead of heating plates 20 as shown, circumferential heating cassettes or other forms of heating elements could also be provided, as the skilled person will recognize. As previously indicated, the heating plates 20 or other suitable heating elements may also be arranged within the process chamber 10 such that longitudinally adjacent heating zones are provided.

The heating plates 20 are designed to provide a substantially constant temperature in the process chamber 10 within the respective zone across the width of the process chamber and the covered length range. In particular, they are designed to set a temperature in the range of 220 to 400° C. Insulation 14 surrounds the process chamber 10 and the heating unit 12 to thermally insulate them from the environment, as is known in the art of continuous furnaces.

The airlock units 4 and 5 may be of any construction to provide sufficient tightness to substantially prevent the passage of gases into or out of the process chamber at a given process pressure. At atmospheric process pressure or a slight negative pressure, in some cases a gas curtain in the airlock could be sufficient to separate the ambient atmosphere from the process atmosphere.

Figure 4:
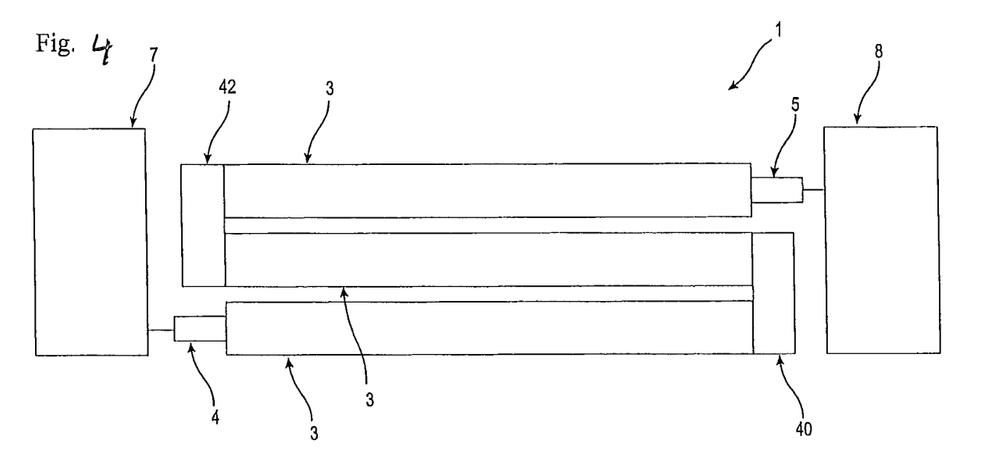
FIG. 4. shows a schematic side view of an alternative embodiment of a stabilizing apparatus according to the invention.

FIG. 4 shows an alternative embodiment of a stabilizing apparatus 1 with three vertically stacked process units 3, an inlet-side airlock unit 4, an outlet-side airlock unit 5, a fiber feed 7, a fiber take-up 8, and deflection units 40 and 41. Strictly speaking, the fiber feed 7 and the fiber take-up 8 are again not part of the stabilizing apparatus 1, since they only provide for a fiber feed to the stabilizing apparatus 1 and a take-up from the same. They are suitable for continuously supplying or taking up precursor fibers 2. Thereby, the units 7, 8 are each suitable to supply or take up a plurality of precursor fibers 2 parallel to each other in one plane, as indicated in the top view in FIG. 2. Since such units are generally known and are known on the market in various embodiments, no further description of these units 7, 8 will be given.

In the embodiment shown, three process units 3, which can have the same structure as in the first embodiment, are provided vertically one above the other. The inlet-side airlock unit 4 is attached to the left side of the lowermost process unit 3, and the outlet-side airlock unit 5 is attached to the right side of the upper process unit 3. The airlock units 4, 5 can again have essentially the same structure as in the first embodiment.

The right end of the lower process unit 3 is connected in a vacuum-tight manner to the right end of the intermediate process unit 3 via the deflection unit 40. The left end of the intermediate processing unit 3 is in turn connected in a vacuum-tight manner to the left end of the upper processing unit 3 via the deflection unit 42.

Figure 5:
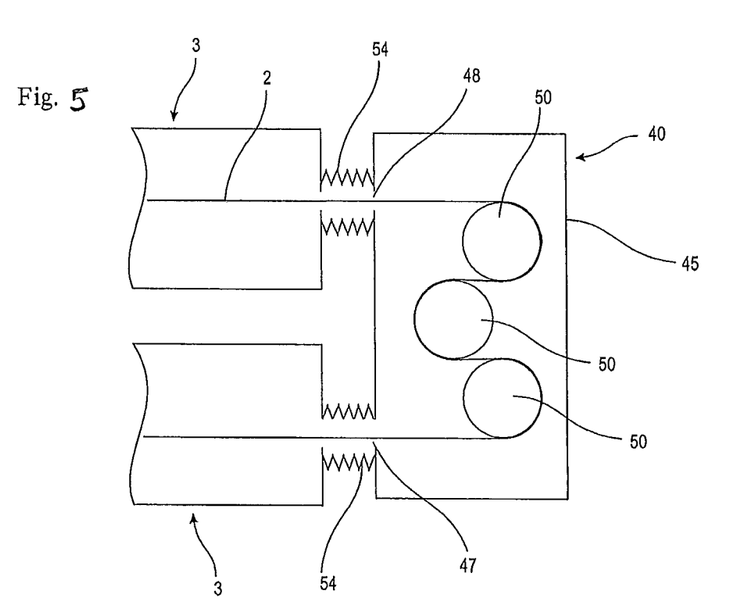
FIG. 5. shows an enlarged detailed view of a deflection unit according to the embodiment of FIG. 4.

The deflection units 40. 42 are essentially of the same design and the deflection unit 40 is explained in more detail below. The deflection unit 40 has a gas- or vacuum-tight housing 45, which has two passages 47, 48 in a side wall of the housing 45, as well as transport and guide rollers 50. The housing 45 has a suitable shape and size such that it can be attached to the ends of two stacked process units 3 in order to connect them. For this purpose, the passages 47, 48 in the side wall are aligned with corresponding openings in the ends of the process units 3. In particular, the deflection unit is connected to the respective ends of the process units 3 via bellows units 54 to allow a gas- or vacuum-tight but flexible connection between the units. This is particularly advantageous since the process units 3 are heated during operation and can expand thermally. A flexible bellows connection as shown can prevent stresses between the different units. Alternatively, however, it would also be possible to attach the deflection unit 40 directly, i.e. rigidly, to the ends of the process unit 3.

The transport and guide rollers 50 are arranged offset from one another and one above the other in such a way that the precursor fibers 2 can be fed through one of the feedthroughs 47, around the transport and guide rollers 50 and out of the other of the feedthroughs 48. In the embodiment, three transport and guide rollers 50 are provided, of which, for example, the upper and lower ones are of a fixed design, while the middle one is designed as a dancer roller which can move, for example, in the horizontal direction in order to adjust a tension of the precursor fibers 2 and/or to accommodate variations in the transport. At least one of the transport and guide rollers 50 may be connected to a drive motor to provide active drive during deflection. The drive motor can be located inside the vacuum housing 45 or outside, in which case a vacuum-tight feed-through for the drive shaft should be provided.

The transport and guide rollers 50 are arranged offset from one another and one above the other in such a way that the precursor fibers 2 can be fed through one of the passages 47, around the transport and guide rollers 50 and out of the other of the passages 48. In the embodiment, three transport and guide rollers 50 are provided, of which, for example, the upper and lower ones are of a fixed design, while the middle one is designed as a dancer roller which can move, for example, in the horizontal direction in order to adjust a tension of the precursor fibers 2 and/or to accommodate variations during the transport. At least one of the transport and guide rollers 50 may be connected to a drive motor to provide active drive during deflection. The drive motor may be located inside the vacuum housing 45 or outside, wherein in the latter case a gas- or vacuum-tight feedthrough of the drive shaft should be provided.

In the following, a stabilization process using the stabilization apparatus 1 is explained in more detail, assuming an apparatus according to FIG. 1 is present. The exemplary values given here for a wide variety of parameters are exemplary and preferred ranges of values are defined subsequently. First, a plurality of precursor fibers 2—for example PAN fibers—running parallel to one another are fed from the feed unit 7 via the lock unit 4 into the process unit 3. From process unit 3, the precursor fibers 2 are then guided via airlock unit 5 to take-up unit 8, where they are taken up again. In the process unit, a predetermined process gas atmosphere is then set, which differs in composition from the ambient air and contains at least one reactive component and/or a catalyst with a predetermined partial pressure. In the case of PAN fibers, oxygen is regarded as a reactive component and the partial pressure of oxygen in an otherwise largely inert gas mixture (containing nitrogen, for example) is preferably set to 5 to 60 mbar. This corresponds approximately to a pressure of 25 to 300 mbar ambient air. An oxygen partial pressure in the range of 10 to 40 mbar has so far proved to be particularly advantageous. Via the gas feed, the process chamber 10 is pressurized with an appropriate process gas mixture, which is exhausted again via the pump. The exhausted air is cleaned via a corresponding after-treatment unit in order to separate or render harmless any undesirable gases produced during operation, such as $CO$, $CO_2$, $NH_3$ or $HCN$.

Further, the heating plates 20 are controlled to generate a constant temperature in the process chamber 10 in their respective zones. For example, a temperature of 260° C. is set in the first zone on the left. In the adjacent zones, for example, temperatures of 320° C., 360° C., 380° C. and 400° C. are then set. Thus, there is a temperature step of 60° C. between the first two zones and a temperature step of 40° C. between the second and third zones. Over the last three zones the temperature step is constant at 20° C. The precursor fibers 2 are now passed through the process unit 3 at a predetermined speed, the speed being set so that the precursor fibers 2 remain in the respective zones for a predetermined time in each case.

In the respective heating zone, the precursor fibers 2 are rapidly heated to the corresponding temperature and kept at this temperature during the passage. Thus, in the above example, the precursor fibers 2 are first heated to 260° C. in a controlled gas atmosphere in the process chamber 10 and held at this temperature for about 20 minutes before being heated to 320° C. and held at this temperature again for about 20 minutes. Subsequently, the precursor fibers 2 are heated to 360° C. and held at this temperature for approximately 20 minutes. They are then treated at 380 and 400° C. for 20 minutes each. As the precursor fibers 2 pass through the heating zones in the process chamber 10, they are stabilized.

The inventors have found that in the controlled process gas atmosphere containing a reactive and/or catalytic component with a predetermined partial pressure, higher temperatures can be used than at atmospheric pressure in air without burning or thermally damaging the precursor fibers 2. This made it possible to reproducibly produce uniformly stabilized precursor fibers 2 with a high density.

The inventors have determined that at least a stepwise temperature increase is advantageous, whereby for PAN fibers the first temperature is in the range 220 to 320° C. and the second temperature is in the range 280 to 400° C. Hereby, the second temperature represents the highest temperature within the process chamber 10, while even lower temperatures can be set before the first temperature. Preferably, the first temperature is in the range 260 to 320° C. and the second temperature is in the range 300 to 400° C., which is substantially higher than the temperatures used in the prior art. Preferably, the second temperature is at least 30° C., more preferably at least 40° C. higher than the first temperature. The temperature may be increased in steps, the temperature difference between successive steps being at least 5° C., in particular at least 10° C., and precursor fibers being kept at the at least one intermediate temperature for a predetermined period of time.

The duration per temperature step should preferably be at least 5 minutes, although the duration can also be shorter in the case of small temperature steps. In the above embodiment, the dwell time depends on the length of the respective heating zone and the transport speed of the precursor fibers 2. While the length of the individual heating zones is predetermined, the dwell time can be adjusted via the transport speed. Of course, heating zones can also be heated uniformly, for example to multiply the dwell time at a certain temperature.

The above process description is based on a single process unit 3 as shown in FIG. 1. In an embodiment according to FIG. 6 with three stacked process units 3, the sequence is similar, although here, for example, only one or two heating zones per process unit 3 can be provided in which the different temperatures are set. The deflection units are not heated, so that a slight cooling of the precursor fibers 2 may occur during the transition from one process unit 3 to the next, but this is not considered to be detrimental since the stabilization achieved up to this point is maintained. However, should problems arise from intermediate cooling, it would also be possible to control the temperature of the respective deflection units accordingly.

In the embodiment with several levels of process chambers, it has proven advantageous when the temperature ranges of two successive levels at least partially overlap. Thus, it is advantageous if the fiber re-enters the next level at the same or even lower temperature than when exiting the previous level.

The embodiment according to FIG. 6 allows a more flexible temperature setting with several heating zones while requiring less floor space. Instead of three, of course, only two or more process units can be provided, one above the other, whereby with an even number of process units 3 the precursor fibers 2 would have to be fed in and taken out from the same side.

Other precursor fibers can be stabilized accordingly, in which case a different reactive and/or a catalytic component with a predetermined partial pressure, other temperature ranges and residence times can be used. Other precursors already containing oxygen, such as lignin or cellulose, do not necessarily require externally supplied oxygen for stabilization, but in some cases stabilization can be accelerated by externally supplied oxygen. To promote stabilization, reactive substances and/or catalysts can be introduced directly into the fibers in a controlled manner via the gas phase. For precursor fibers based on cellulose and/or lignin, the first temperature is preferably in the range of 200-240° C. and the second temperature is preferably in the range of 240-300° C. If the precursor fibers contain cellulose, the process gas atmosphere should be an acidic atmosphere that promotes dehydration of cellulose. Preferably, an acidic component in the process gas is controlled by the partial pressure to control dehydration. If the precursor fibers contain lignin with a latent curing agent, the process gas atmosphere should again preferably be an acidic atmosphere that activates the latent curing agent in the lignin. Again, the acid component in the process gas can be controlled by the partial pressure to control the activation.

For cellulose and lignin fibers, it is also conceivable that the curing agent is added from the gas phase, in which case it is preferably reactive formaldehyde. In the case of cellulose fibers, it may also be useful to impregnate the fibers with sulfur-containing substances from the gas phase to increase the carbon yield of the fiber.

To increase the mechanical strength, in particular the stiffness of the final carbon fiber based on PAN and/or lignin and/or cellulose, it has proved advantageous to introduce boron-containing compounds into the fiber via the gas phase. The use of diborane as boronating reagent is particularly preferred. It would be advantageous to achieve a boron concentration of 0.1-2%.

It could also be useful to treat precursor fibers made from blends of PAN and lignin with iodine, which would provide increased strength and orientation of the final carbon fiber.

The application has been explained in more detail with reference to preferred embodiments, without being limited to the specific embodiments.

The invention claimed is:

1. A method for stabilizing precursor fibers for the production of carbon fibers, comprising the steps of:
   continuously introducing, passing and removing the precursor fibers into, through and from a process chamber;
   setting a predetermined process gas atmosphere different in composition from ambient air in said process chamber, said process gas atmosphere being below atmospheric pressure and containing air and/or pure oxygen as a reactive component and/or catalyst, the air and/or pure oxygen having a predetermined partial pressure;
   while the precursor fibers are in the process chamber, heating the precursor fibers to at least a first temperature and maintaining the first temperature for a predetermined period of time, wherein the method is free from steps in which magnetic fields are applied to the precursor fibers in the process chamber.

2. The method according to claim 1, wherein the pressure in the process chamber is at least 90% of ambient pressure.

3. The method according to claim 1, further comprising heating the precursor fibers to at least a second temperature while the precursor fibers are in the process chamber, the second temperature being higher than the first temperature, and maintaining the temperature for a predetermined period of time.

4. The method according to claim 3, wherein the precursor fibers are heated from the first temperature to that of the second temperature via at least one further intermediate temperature, wherein the temperature difference between temporally successive stages is at least 5° C., and wherein precursor fibers are held at the at least one intermediate temperature for a predetermined period of time.

5. The method according to claim 1, wherein the second temperature is higher than the first temperature by at least 30° C.

6. The method according to claim 1, wherein the precursor fibers are kept at the first temperature, the second temperature and at least one optional intermediate temperature for at least 10 min each.

7. The method according to claim 1, wherein the precursor fibers comprise polyacrylonitrile fibers and the first temperature is in the range 220 to 320° C. and the second temperature is in the range 280 to 400° C.

8. The method according to claim 7, wherein the first temperature is in the range 260 to 320° C. and the second temperature is in the range 300 to 380° C.

9. The method according to claim 1, wherein the precursor fibers comprise polyacrylonitrile fibers and the process gas atmosphere has as reactive component oxygen with a partial pressure of from 5 to 60 mbar.

10. The method according to claim 1, wherein the precursor fibers are based on cellulose and/or lignin and the first temperature is in the range 200-240° C. and the second temperature is in the range 240-300° C.

11. The method according to claim 1, wherein the precursor fibers comprise cellulose and the process gas atmosphere is an acidic atmosphere promoting dehydration of cellulose.

12. The method according to claim 11, wherein the acidic, sulfur- or boron-containing component in the process gas is controlled via the partial pressure to control dehydration.

13. The method according to claim 11, wherein the acid, sulfur or boron containing component in the process gas is controlled by the partial pressure to control the activation.

14. The method according to claim 1, wherein the precursor fibers comprise cellulose and/or lignin and the process gas atmosphere comprises sulfur-containing compounds.

15. The method according to claim 1, wherein the precursor fibers comprise polyacrylonitrile and/or cellulose and/or lignin and the process gas atmosphere comprises boron-containing compounds.

16. The method according to claim 1, wherein the precursor fibers comprise lignin and a latent curing agent and the process gas atmosphere is an acidic atmosphere that activates the latent curing agent in the lignin.

17. The method according to claim 1, wherein the precursor fibers are lignin processed in a curing atmosphere of formaldehyde.

18. The method according to claim 1, wherein the precursor fibers are kept under defined tension during the process.

19. The method according to claim 1, wherein the gas atmosphere is exchanged continuously or intermittently during the stabilization process.

20. The method according to claim 1, wherein the precursor fibers are passed through a plurality of substantially parallel process chambers, each adjacent process chamber being connected at one end via a deflection unit in such a way that the fibers remain in the process gas atmosphere.

21. The method according to claim 1, wherein the process gas atmosphere comprises a mixture including inert gas in addition to the air and/or pure oxygen, the mixture being selected to produce the predetermined partial pressure of the air and/or pure oxygen in the process gas atmosphere.

* * * * *